United States Patent [19]
Anders et al.

[11] Patent Number: 5,826,522
[45] Date of Patent: Oct. 27, 1998

[54] SYSTEM FOR APPLYING ANHYDROUS AMMONIA

[75] Inventors: Michael J. Anders; Burr Anders; Brian J. Wenthold, all of Blue Earth, Minn.

[73] Assignee: AG Systems, Inc., Hutchinson, Minn.

[21] Appl. No.: 703,392

[22] Filed: Aug. 26, 1996

[51] Int. Cl.⁶ ............................................. A01C 23/02
[52] U.S. Cl. ..................... 111/119; 222/1; 222/146.2; 222/318
[58] Field of Search .................... 222/1, 146.1, 146.2, 222/146.5, 318, 608; 239/124, 127, 130, 139, 172; 111/119

[56] References Cited

U.S. PATENT DOCUMENTS

| | | | |
|---|---|---|---|
| 2,612,760 | 10/1952 | Baggette et al. | 111/119 X |
| 2,650,556 | 9/1953 | Turner | 111/119 |
| 3,148,642 | 9/1964 | Gould | 111/119 |
| 4,055,279 | 10/1977 | Lapera et al. | 222/146.2 X |
| 4,069,029 | 1/1978 | Hudson | 111/119 X |
| 4,140,150 | 2/1979 | Rundell | 222/146.2 X |
| 4,202,283 | 5/1980 | Wiseboeck | 111/119 |
| 4,458,609 | 7/1984 | Tofte | 111/119 |
| 5,170,820 | 12/1992 | Jones | 239/156 X |
| 5,636,790 | 6/1997 | Brusko et al. | 239/127 X |

*Primary Examiner*—Kevin P. Shaver
*Attorney, Agent, or Firm*—Merchant, Gould, Smith, Edell, Welter & Schmidt, P.A.

[57] ABSTRACT

A system for applying pressurized anhydrous ammonia to soil. The system includes a tank for containing the pressurized anhydrous ammonia. An anhydrous ammonia meter is in fluid communication with the tank for dispersing controlled amounts of the anhydrous ammonia. A pressurization unit is also in fluid communication with the tank. The pressurization unit defines a pressurization chamber through which anhydrous ammonia from the tank is circulated. A heating system cooperates with the pressurization unit to heat the anhydrous ammonia within the pressurization chamber. The heated anhydrous ammonia is returned from the pressurization chamber to the tank. By adding the heated anhydrous ammonia to the tank, the pressure within the tank is stabilized or even slightly increased.

11 Claims, 3 Drawing Sheets

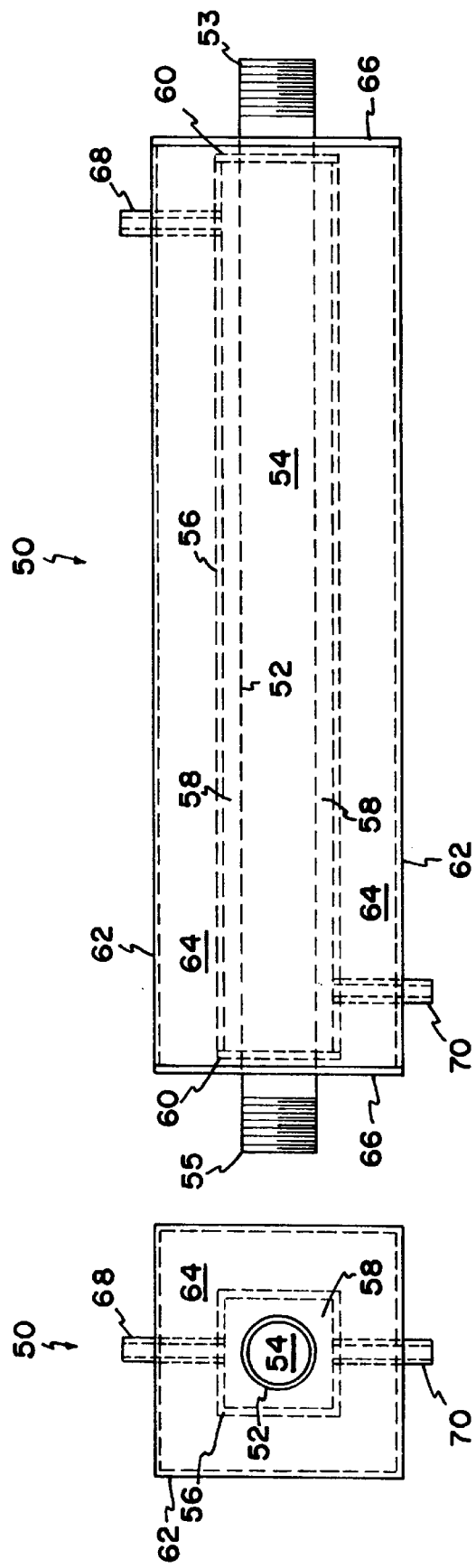

SYSTEM FOR APPLYING ANHYDROUS AMMONIA

FIELD OF THE INVENTION

The present invention relates generally to agricultural devices. More particularly, the present invention relates to agricultural devices for fertilizing soil through the use of anhydrous ammonia.

BACKGROUND OF THE INVENTION

Anhydrous ammonia is a widely used nitrogen based fertilizer. To be used effectively for agricultural purposes, it is important for anhydrous ammonia to be applied uniformly. It is also important for the anhydrous ammonia to be applied as rapidly as possible in order to minimize time and labor costs.

A typical anhydrous ammonia application system includes a tool bar that is pulled behind a tractor. A tank of pressurized anhydrous ammonia is usually mounted on a wagon coupled to the tool bar. An anhydrous ammonia application meter is mounted on the tool bar. The application meter is fluidly connected to the tank by a hose. Source pressure within the tank forces anhydrous ammonia to flow through the hose from the tank to the application meter. The application meter distributes controlled amounts of anhydrous ammonia to knives or probes that are mounted on the tool bar. The knives project downward from the tool bar and extend into the soil to provide a means for injecting the anhydrous ammonia directly into the soil.

Anhydrous ammonia application meters depend on source tank pressure to accurately dispense controlled amounts of nitrogen. Cold outside temperatures can cause source tank pressures to drop dramatically. Consequently, in cold weather situations, operators are at best forced to substantially slow down their application of nitrogen. At worst, operators are forced to stop fertilizing altogether until their anhydrous ammonia supply tanks can be warmed up to increase the tank pressure.

Preferred fertilization seasons are typically in the spring and fall. During these seasons, cold weather is a common occurrence that often prevents farmers from efficiently fertilizing their fields. What is needed is an anhydrous ammonia application system that is operable in cold weather situations.

SUMMARY OF THE INVENTION

The present invention relates to a device for dispensing/applying pressurized anhydrous ammonia. The device includes a tank containing pressurized anhydrous ammonia and an application meter for dispensing controlled amounts of anhydrous ammonia from the tank. A pressurization unit defines a pressurization chamber that is in fluid communication with the tank. A first fluid line directs at least some of the anhydrous ammonia from the tank to the pressurization chamber. A heating system heats the pressurization unit such that anhydrous ammonia within the pressurization chamber is heated and the anhydrous ammonia pressure within the pressurization chamber is increased. A second flow line recirculates the heated anhydrous ammonia from the pressurization chamber back into the tank.

In use, the above-described device provides a method for maintaining anhydrous ammonia pressure within a tank. The method includes the step of circulating some of the anhydrous ammonia from the tank through the pressurization chamber. The anhydrous ammonia is heated as it circulates through the pressurization chamber. Next, the heated anhydrous ammonia is returned from the pressurization chamber to the tank where it functions to maintain fluid pressure within the tank.

By constantly supplying the tank with heated anhydrous ammonia, the fluid pressure in the tank is maintained despite cold outside temperatures. By maintaining pressure in the tank, the anhydrous ammonia meter is able to continue applying the proper amounts of anhydrous ammonia. Consequently, an operator of the device can continue applying anhydrous ammonia at normal rates even in cold temperatures.

A variety of additional advantages of the invention will be set forth in part in the description which follows. Many advantages of the invention will be realized and attained by means of the elements and combinations particularly pointed out in the claims. In this regard, it is to be understood that both the foregoing general description and the following detailed description are exemplary and explanatory only and are not restrictive of the invention as claimed.

BRIEF DESCRIPTION OF THE DRAWINGS

The accompanying drawings, which are incorporated in and constitute a part of this specification, illustrate several embodiments of the invention and together with the description, serve to explain the principles of the invention. A brief description of the drawings is as follows:

FIG. 2 is a side view of a pressurization unit constructed in accordance with the principles of the present invention;

FIG. 3 is an end view of the pressurization unit of FIG. 2; and

DETAILED DESCRIPTION OF THE PREFERRED EMBODIMENT

Reference will now be made in detail to exemplary embodiments of the present invention which are illustrated in the accompanying drawings. Wherever possible, the same reference numbers will be used throughout the drawings to refer to the same or like parts.

Figure 1:
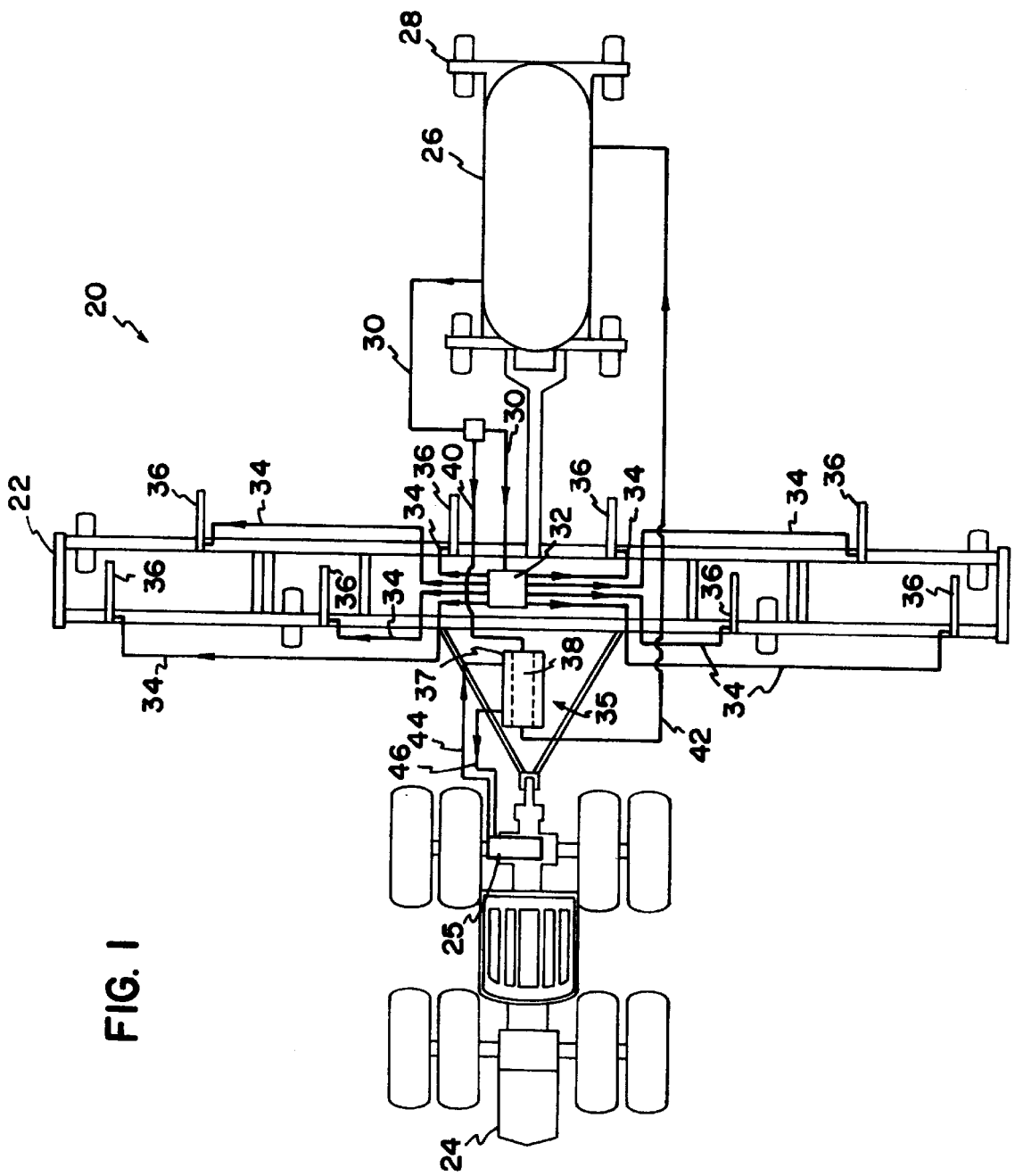
FIG. 1 is a diagrammatic view of a device for applying anhydrous ammonia constructed in accordance with the principles of the present invention.

FIG. 1 shows a diagrammatic view of an exemplary device 20 for dispersing/applying pressurized anhydrous ammonia. The device includes a tool bar 22 that is coupled to a motive power source such as a tractor 24. A tank 26 of pressurized anhydrous ammonia is mounted on a wagon 28 that is coupled to the tool bar 22. A first flow line 30 fluidly connects the tank 26 to a conventional anhydrous ammonia meter 32. A plurality of second flow lines 34 fluidly connect the meter 32 to a plurality of probes or knives 36 that are mounted on the tool bar 22. The knives 36 extend downward from the tool bar 22 and are oriented to cut into the soil and inject anhydrous ammonia therein.

In operation, a mixture of liquid and vapor anhydrous ammonia flows through the first flow line 30 from the tank 26 to the anhydrous ammonia meter 32. Tank pressure forces the anhydrous ammonia through the meter 32 and out the plurality of second flow lines 34 to the knives 36 which inject the anhydrous ammonia into the soil. The application meter 32 relies upon an active supply of source tank pressure to insure that the correct amount of anhydrous ammonia is being forced through the meter 32 and incorporated into the soil by the knives 36.

The device 20 also includes a system for maintaining anhydrous ammonia pressure within the tank 26. As shown in FIG. 1, the system includes a pressurization unit 35 defining a pressurization chamber 38. The pressurization unit 35 is preferably mounted on a center section of the tool bar 22. A third flow line 40 fluidly connects the first flow line 30 to an inlet side of the pressurization chamber 38. A fourth flow line 42 fluidly connects an outlet side of the pressurization chamber 38 to the tank 26. To maximize the volume of the pressurization chamber 38, the pressurization chamber 38 preferably has a cross-sectional area substantially larger than the cross-sectional area of the third flow line 40.

Anhydrous ammonia is heated within the pressurization chamber 38 by an exterior heat source. As shown in FIG. 1, the tractor 24 includes a conventional hydraulic system 25, and the heat source comprises warm hydraulic fluid from the hydraulic system 25. A fifth flow line 44 carries the warm hydraulic fluid from the tractor's hydraulic system 25 to a heating chamber 37 (shown in phantom line in FIG. 1) that surrounds the pressurization chamber 38. The warm hydraulic fluid circulates through the heating chamber 37 thereby transferring heat from the heating chamber 37 to anhydrous ammonia within the pressurization chamber 38. A sixth flow line 46 carries the hydraulic fluid from the heating chamber 37 back to the tractor's hydraulic system 25.

It will be appreciated that hydraulic fluid from the tractor 24 is commonly used as a power source for folding the various sections of the tool bar 22 and for adjusting the wheel heights of the tool bar 22. Consequently, it is convenient to use the tractor's hydraulic fluid, which is warmed as it performs work, as a source for heating the pressurization chamber 38. However, it will be appreciated that in alternative embodiments of the present invention, other heating techniques and heat sources can be used to heat the pressurization chamber 38.

In operation, the pressure maintenance system of the device 20 provides a method for maintaining anhydrous ammonia pressure within the tank 26 even in cold temperatures. In practice, a mixture of liquid and vapor anhydrous ammonia is siphoned off the first flow line 30 by the third flow line 40. The third flow line 40 carries the anhydrous ammonia mixture to the pressurization chamber 38. While in the pressurization chamber 38, the anhydrous ammonia is heated by the source of external heat such that the liquid anhydrous ammonia is vaporized and the anhydrous ammonia pressure within the chamber 38 increases. The heated anhydrous ammonia then exits the pressurization chamber 38 through the fourth flow line 42 and is carried back to the tank 26. By adding the warm anhydrous ammonia vapor back to the supply tank 26, pressure within the tank 26 is stabilized or even slightly increased. The stabilized pressure within the tank 26 allows an operator of the device 20 to maintain constant ground speed even in cold weather.

It will be appreciated that the flow lines described above typically comprise high pressure hose, tubing, piping, or other conventionally know conduit for conveying pressurized fluids.

FIGS. 2 and 3 show an exemplary pressurization unit 50 that is suitable for practicing the present invention. The pressurization unit 50 includes an inner structure 52 defining a pressurization chamber 54. As shown in FIGS. 2 and 3, the inner structure 52 preferably comprises a steel pipe having a threaded inlet end 53 located opposite from a threaded outlet end 55.

The pressurization unit 50 also includes a sleeve 56 surrounding the inner structure 52. The inner structure 52 and the sleeve 56 together define a heating chamber 58 thereinbetween. As shown in FIGS. 2 and 3, the sleeve 56 preferably comprises an elongated rectangular steel box mounted around the inner structure 52. Square steel end plates 60 enclose the ends of the sleeve 56. The end plates are welded between the ends of the sleeve 56 and the exterior of the inner structure 52.

The pressurization unit 50 further preferably includes an outer housing 62 that encloses the pressurization unit 50. As shown in FIGS. 2 and 3, the outer housing 62 is an elongated generally rectangular steel box that surrounds the sleeve 56. A void 64 is defined between the sleeve 56 and the outer housing 62. To maximize the heating efficiency of the pressurization unit 50, it is preferred for the void 64 to be filled with an insulating material such as foam. Square end plates 66 are welded to the ends of the outer housing 62 and to the outer surface of the inner structure 52 to enclose the ends of the housing 62.

The pressurization unit 50 also includes an inlet pipe 68 in fluid communication with one end of the heating chamber 58 and an outlet pipe 70 in fluid communication with the other end of the heating chamber 58. The inlet and outlet pipes 68 and 70 extend transversely through the outer housing 62 and the sleeve 56 and are preferably welded in place. It is preferred for the inlet and outlet pipes 68 and 70 to be located at opposite ends of the heating chamber 58 and to extend transversely outward from opposite sides of the sleeve 56.

Figure 4:
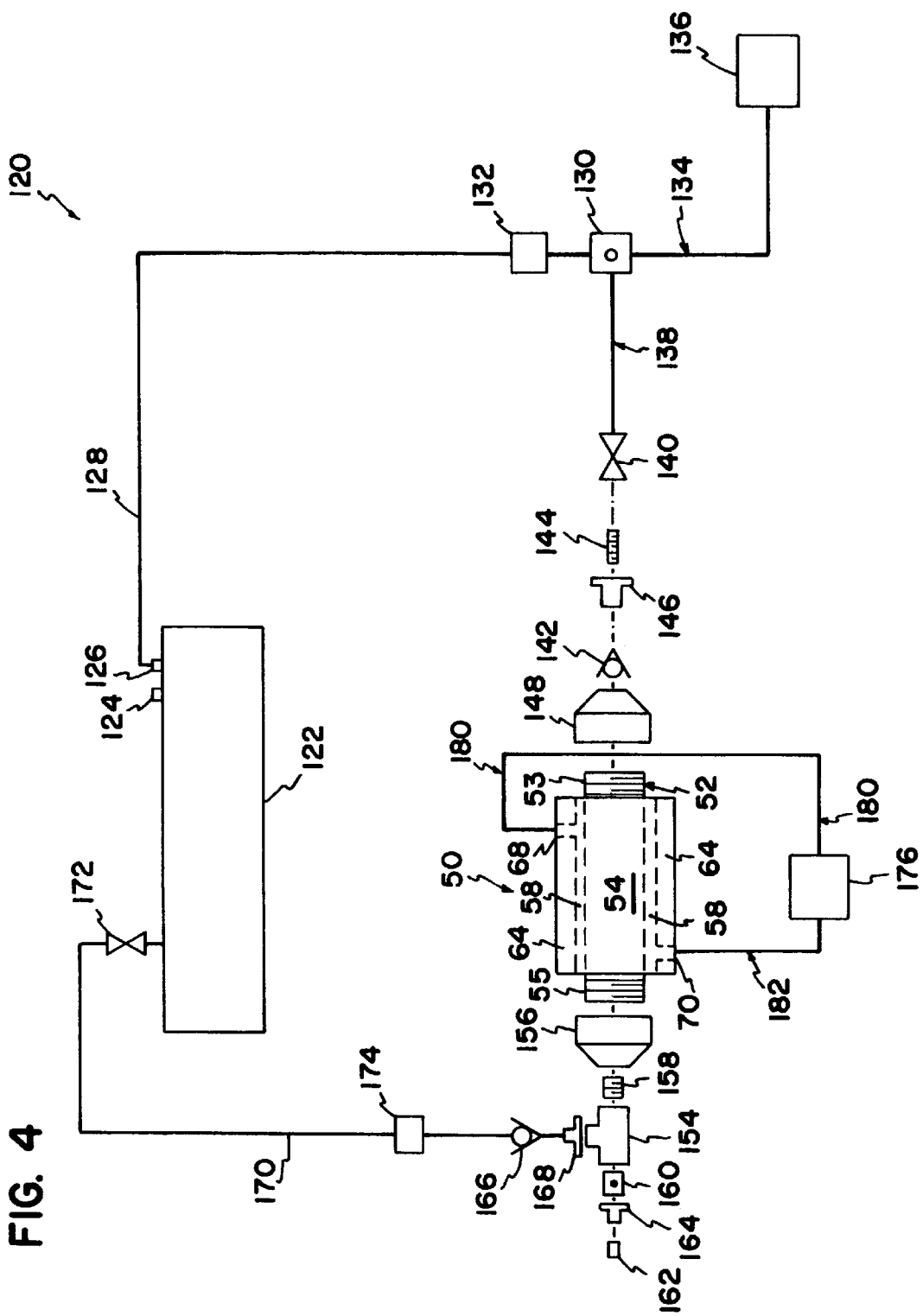
FIG. 4 is a diagrammatic view illustrating a coupling configuration suitable for incorporating the pressurization unit of FIGS. 2 and 3 within a system for applying anhydrous ammonia.

FIG. 4 is a diagrammatic illustration showing an anhydrous ammonia application system 120 incorporating the pressurization unit 50. The system 120 includes an anhydrous ammonia tank 122. The tank 122 has a fill valve 124 and a withdrawal valve 126. A first flow line 128 fluidly connects the withdrawal valve 126 to a relief adapter 130. The relief adapter 130 is preferably configured to release excess pressure within the first flow line 128. A conventional quick coupler 132 preferably connects the first flow line 128 to the relief adapter 130.

The quick coupler 132 is a safety feature that allows the first flow line 128 to disconnect from the relief adapter 130 if stress is applied to the line 128. The quick coupler 132 automatically closes upon disconnection to prevent any anhydrous ammonia from escaping from the system.

The quick coupler 132 is important because a typical anhydrous ammonia tank is mounted on a wagon pulled behind a tool bar. If the wagon accidentally uncouples from the tool bar, the quick coupler 132 disconnects from the relief adapter and closes the flow line 128.

A second flow line 134 fluidly connects the relief adapter 130 to an anhydrous ammonia application meter 136 for controlling anhydrous ammonia distribution to the soil. A third flow line 138 fluidly connects the relief adapter 130 to a valve 140 for opening and closing the flow line 138. The valve 140 is connected to a back check valve 142 by a close nipple 144 and a bushing 146. A reducer coupling 148 connects the back check valve 142 to the inlet end 53 of the inner structure 52 such that the pressurization chamber 54 is in fluid communication with the third flow line 138. The back check valve 142 is a one way valve that allows anhydrous ammonia to flow through the third flow line 138 into the pressurization chamber 54 and prevents anhydrous ammonia from exiting the pressurization chamber 54 through the third flow line 138.

The outlet end 55 of the inner structure 52 is coupled to a T-fitting 154 by a reducer coupling 156 and a close nipple 158. The T-fitting 154 is coupled to a relief adapter 160 for releasing excess pressure from the system. The relief adapter 160 is coupled to hydrostat 162 by a bushing 164. The T-fitting 154 is also coupled to a second back check valve 166 by a bushing 168. A fourth flow line 170 fluidly connects the second back check valve 166 to an open/close valve 172, preferably equipped with a bleeding mechanism, that is coupled to the tank 122. The second back check valve 166 is a one-way valve that allows anhydrous ammonia to exit the pressurization chamber 54 through the fourth flow line 170 and prevent anhydrous ammonia from entering the pressurization chamber 54 through the fourth flow line 170. A quick coupler 174 is positioned in line with the fourth flow line 170 to provide a safety disconnect if stress is placed on the line 170.

The system 120 also includes a source of heated fluid 176. The source of heated fluid 176 circulates heated fluid through the heating chamber 58 that surrounds the pressurization chamber 54. The heated fluid enters the heating chamber 58 through an input line 180 connected to inlet pipe 68 and exits the heating chamber 58 through an output line 182 connected to outlet pipe 70.

In operation, tank pressure forces a mixture of liquid and vapor anhydrous ammonia through the first flow line 128 to the relief adapter 130. At the relief adapter 130, some liquid along with some vaporized anhydrous ammonia is siphoned into the third flow line 138. The remainder of the anhydrous ammonia is directed to the application meter 136 by the second flow line 134.

The anhydrous ammonia in the third flow line 138 flows through the first back check valve 142 into the pressurization chamber 54. The first back check valve 142 only allows flow in one direction. Consequently, once the anhydrous ammonia has entered the pressurization chamber 54, it cannot exit the pressurization chamber 54 through the third flow line 138. Instead, the anhydrous ammonia is forced to move in one direction from the input end of the pressurization chamber 54 toward the output end of the pressurization chamber 54.

While the anhydrous ammonia is within the pressurization chamber 54, it draws heat from the heated fluid that is being circulated through the heating chamber 58 by the source of heated fluid 176. As the anhydrous ammonia is heated, the liquid portion of the anhydrous ammonia is vaporized thereby creating higher pressure within the pressurization chamber 54. As the pressure within the pressurization chamber 54 increases, the first back check valve 142 is forced closed and the second back check valve 166 is forced open. It will be appreciated that the back check valves 142 and 166 are preferably configured to open and close concurrently.

When the second back check valve 166 is forced open, the heated/vaporized anhydrous ammonia rushes out of the outlet side of the pressurization chamber 54 into the fourth flow line 170. The heated anhydrous ammonia travels through the fourth flow line 170 into the source tank 122. It will be appreciated that the vaporized/heated anhydrous ammonia continues to flow through the further flow line 170 to the tank 122 until the pressure in the tank 122 exceeds the pressure in the pressurization chamber 54. When the pressure in the tank 122 exceeds the pressure in the chamber 54, the second back check valve 166 is forced closed and the first check valve 142 is forced open causing additional anhydrous ammonia to flow into the pressurization chamber 54. By continuously cycling quantities of anhydrous ammonia between the pressurization chamber 54 and the source tank 122, source tank pressure is maintained or increased. The maintenance of tank pressure, even in cold weather improves the operation of the anhydrous ammonia application meter 136.

With regard to the foregoing description, it is to be understood that changes may be made in detail, especially in matters of the construction materials employed and the shape, size, and arrangement of the parts without departing from the scope of the present invention. It is intended that the specification and depicted embodiment be considered exemplary only, with a true scope and spirit of the invention being indicated by the broad meaning of the following claims.

What is claimed is as follows:

1. A device for dispensing pressurized anhydrous ammonia comprising:
   a tank for containing the anhydrous ammonia;
   an anhydrous ammonia meter in fluid communication with the tank for dispensing controlled amounts of the anhydrous ammonia from the tank;
   a pressurization structure defining a pressurization chamber;
   fluid lines fluidly interconnecting the tank and the pressurization chamber for circulating at least some of the anhydrous ammonia between the tank and the pressurization chamber; and
   a heating system for heating the pressurization structure such that anhydrous ammonia within the pressurization chamber is heated.

2. The device of claim 1, wherein the fluid lines include an inlet line for directing anhydrous ammonia flow from the tank to the pressurization chamber and an outlet line for directing anhydrous ammonia flow from the pressurization chamber to the tank, the inlet line including a first one-way valve that only allows flow into the pressurization chamber, and the outlet line including a second one-way valve that only allows flow out of the pressurization chamber.

3. The device of claim 2, wherein the pressurization chamber is an elongated hollow cylinder having an inlet end positioned longitudinally opposite from an outlet end, the inlet line being connected to the inlet end of the pressurization chamber and the outlet line being connected to the outlet end of the pressurization chamber.

4. The device of claim 1, wherein the heating system includes a sleeve surrounding the pressurization structure, the sleeve and the pressurization structure together defining a heating chamber thereinbetween, the heating chamber containing a heated substance that is circulated therethrough.

5. The device of claim 4, further comprising a tractor having a hydraulic system, wherein the heated substance circulated through the heating chamber comprises hydraulic fluid from the hydraulic system.

6. The device of claim 5, wherein the sleeve is surrounded by an insulation structure.

7. The device of claim 6, wherein the insulation structure comprises a layer of foam insulation.

8. The device of claim 1, further comprising a tool bar on which the anhydrous ammonia meter and the pressurization structure are mounted and to which the tank is coupled.

9. The device of claim 8, further comprising a tractor for pulling the tool bar.

10. A method for maintaining pressure within a tank containing anhydrous ammonia, the method comprising the steps of:

circulating some of the anhydrous ammonia from the tank through a pressurization chamber;

heating the anhydrous ammonia within the pressurization chamber;

returning the heated anhydrous ammonia to the tank, wherein the heated anhydrous ammonia maintains fluid pressure within the tank.

11. The method of claim 10, wherein the anhydrous ammonia within the pressurization chamber is heated by circulating heated hydraulic fluid from a tractor hydraulic system around the pressurization chamber.

* * * * *